J. HEIDY.
Improvement in Horse Hay-Rakes.
No. 133,028.   Patented Nov. 12, 1872.
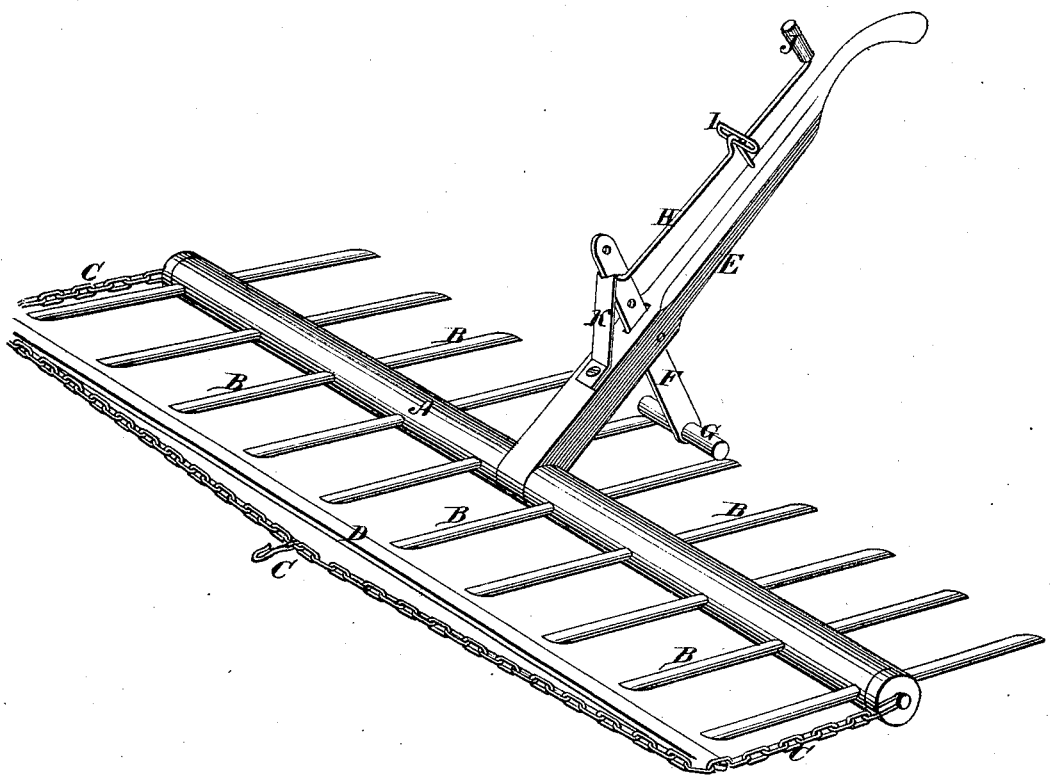
Witnesses.
C. F. Brown.
H. J. Ellsworth.
Inventor.
John Heidy
by his Attorneys
Hill & Ellsworth.

UNITED STATES PATENT OFFICE.

JOHN HEIDY, OF MARTINSBURG, OHIO.

IMPROVEMENT IN HORSE HAY-RAKES.

Specification forming part of Letters Patent No. 133,028, dated November 12, 1872.

*To all whom it may concern:*

Be it known that I, JOHN HEIDY, of Martinsburg, in the county of Knox and State of Ohio, have invented certain new and useful Improvements in Horse Hay-Rakes; and I do hereby declare the following to be a full and exact description of the same, reference being had to the accompanying drawing forming part of this specification, in which the figure is a perspective view of the rake.

Similar letters of reference in the accompanying drawing denote the same parts.

My invention has for its object to improve the construction of revolving horse hay-rakes, whereby they are rendered more complete and efficient in operation. To this end, the invention consists in the combination of parts by which the rake is held to its work, and operated to dump the hay, as I will now proceed to describe.

In the accompanying drawing, A is the rake-head, provided with teeth B in the usual manner, and hung in the ends of a light draft-chain, C, which is held clear of the teeth by the spreader D, as shown. E is the handle, hung to the center of the rake-head by any suitable means that will allow the latter to revolve freely; and F is an upright lever, pivoted in a slot of the handle, so that the cross-bar G, at its lower end, shall bear upon the rear ends of two adjoining rake-teeth, and serve as a stop to control the rotation of the rake. The upper end of the lever is connected to a rod, H, which extends along the handle E, and is provided with a bend or notch to engage with the loop I affixed to the handle, as shown. The outer end of the rod is formed with a handle, S, immediately over the end of the handle E, and within reach of the driver as he walks behind the rake.

When the rake is in operation, and it is desired to dump the hay, the driver lifts the connecting-rod from the loop I, and pushes the lever F forward so that the cross-bar G shall slip off the teeth and fall a little below them. The connecting-rod is then released, when a spring, K, attached to the rake-handle, throws the cross-bar under the teeth, and again engages the connecting-rod with its guide-loop. The operator has now only to lift the ends of the handles so that the cross-bar shall raise all the teeth slightly, when the rake revolves between the ends of the draft-chain and dumps its load in the usual manner, the cross-bar again coming above the teeth to hold them down as before. By this arrangement but little expenditure of strength is required upon the part of the driver to dump the load, while the rake is placed completely under his control, and all the annoyance of accidentally dumping the hay is avoided.

Having thus described my invention, what I claim is—

The handle E pivoted upon the rake-head, the stop-lever F G pivoted to the handle, the spring K acting upon the stop-lever, the bent or notched rod H, and the locking-loop I, all combined and arranged as herein described, for the purpose specified.

JOHN HEIDY.

Witnesses:
ROBERT MURRAY,
DAVID SAWMAN.